(12) United States Patent
Wakasa (10) Patent No.: US 10,209,937 B2
(45) Date of Patent: Feb. 19, 2019

(54) CONTROL DEVICE AND CONTROL METHOD OF CONTROL DEVICE

(71) Applicant: SEIKO EPSON CORPORATION, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 1 day.

(21) Appl. No.: 15/668,270

(22) Filed: Aug. 3, 2017

(65) Prior Publication Data

US 2018/0039461 A1 Feb. 8, 2018

(30) Foreign Application Priority Data

Aug. 4, 2016 (JP) ................................. 2016-153538

(51) Int. Cl.
*G06F 3/12* (2006.01)
*G06F 3/06* (2006.01)

(52) U.S. Cl.
CPC .......... *G06F 3/1254* (2013.01); *G06F 3/1203* (2013.01); *G06F 3/123* (2013.01); *G06F 3/1253* (2013.01); *G06F 3/1259* (2013.01); *G06F 3/0611* (2013.01); *G06F 3/1278* (2013.01)

(58) Field of Classification Search
CPC ...... G06F 3/1254; G06F 3/1203; G06F 3/123; G06F 3/1253; G06F 3/1259; G06F 3/0611; G06F 3/1278
See application file for complete search history.

(56) References Cited

U.S. PATENT DOCUMENTS

2012/0170067 A1* 7/2012 Watanabe ............. G06F 3/1206
358/1.13
2015/0277829 A1* 10/2015 Morita .................. G06F 3/1203
358/1.15

FOREIGN PATENT DOCUMENTS

| JP | 11-175286 A | 7/1999 |
| JP | 2001-216103 A | 8/2001 |
| JP | 2009-134474 A | 6/2009 |
| JP | 2012-141880 A | 7/2012 |

* cited by examiner

*Primary Examiner* — Quang N Vo
(74) *Attorney, Agent, or Firm* — Foley & Lardner LLP (57) ABSTRACT

A host control unit (processor) of a host which can be connected to a printer transmits a setting value requesting command which requests a response of a new function setting value, and a status requesting command which requests a response of a status value, thereafter, to the printer, and determines that the printer corresponds to the setting value requesting command, in a case in which the new function setting value using the setting value requesting command is received earlier than the status value using the status requesting command.

10 Claims, 3 Drawing Sheets

FIG. 1

CONTROL DEVICE AND CONTROL METHOD OF CONTROL DEVICE

BACKGROUND

1. Technical Field

The present invention relates to a control device, and a control method of the control device.

2. Related Art

In the related art, a technology of controlling a printing apparatus using a control device which is connected to the printing apparatus which executes printing has been known (for example, JP-A-11-175286). In JP-A-11-175286, a host (host computer) as a control device which discriminates a firmware version of a printing apparatus, and causes the printing apparatus to download the latest firmware based on a discrimination result is disclosed.

Meanwhile, a control device such as a host described in JP-A-11-175286 transmits a command to a printing apparatus, and causes the printing apparatus to execute a process based on the command. There is a case in which the control device determines whether or not the printing apparatus corresponds to the command to be transmitted, in order to appropriately control the printing apparatus. In this case, when the control device is going to determine whether or not the printing apparatus corresponds to the command to be transmitted, using the command, there is a problem in that it is not possible to perform a determination rapidly.

SUMMARY

An advantage of some aspects of the invention is to make it possible to perform a rapid determination whether or not a printing apparatus corresponds to a command to be transmitted.

According to an aspect of the invention, there is provided a control device which determines whether or not a printing apparatus corresponds to a first command, in which the first command is a command which can be added by the printing apparatus and with which the control device requests a response of a first predetermined value to the printing apparatus, and a second command is a command to which the printing apparatus corresponds and with which the control device requests a response of a second predetermined value to the printing apparatus, the device including: a memory which stores a printer driver corresponding to the printing apparatus to which the first command is added; and a processor which executes the following processes by reading the printer driver from the memory, (a) transmitting the first command to the printing apparatus, (b) transmitting the second command which requests the response of the second predetermined value to the printing apparatus, after (a), and (c) determining that the printing apparatus corresponds to the first command in a case in which the first predetermined value obtained by the first command is received earlier than the second predetermined value obtained by the second command from the printing apparatus.

According to the aspect of the invention, the processor of the control device transmits the first command and the second command to the printing apparatus (corresponding to at least second command), and in a case in which the first predetermined value obtained by the first command is received earlier than the second predetermined value obtained by the second command, since it is possible to determine that the first predetermined value obtained by the first command is received earlier than the second predetermined value which can be reliably received, and the printing apparatus corresponds to the first command, it is possible to rapidly determine whether or not the printing apparatus corresponds to the command to be transmitted.

In the aspect of the invention, in a case in which the second predetermined value obtained by the second command is received earlier than the first predetermined value obtained by the first command in the (c), the processor may determine that the printing apparatus does not correspond to the first command, without waiting for receiving of the first predetermined value obtained by the first command.

According to the aspect of the invention, in a case in which the first command and the second command are transmitted, and the second predetermined value obtained by the second command is received earlier than the first predetermined value obtained by the first command, since the control device determines that the printing apparatus corresponds to the first command without waiting for receiving of the first predetermined value obtained by the first command, it is possible to rapidly determine whether or not the printing apparatus corresponds to the command to be transmitted.

In the aspect of the invention, the first command may be a command which causes the response of the first predetermined value to be executed using a function which can be added to the printing apparatus, and the second command may be a command which causes the response of the second predetermined value to be executed using a function which is provided in the printing apparatus in advance.

According to the aspect of the invention, since the first command is a command which causes the response of the first predetermined value to be executed using the function which can be added to the printing apparatus, and the second command is a command which causes the response of the second predetermined value to be executed using a function executed by the printing apparatus, the control device can rapidly determine whether or not the function is added to the printing apparatus, using a function of the driver.

In the aspect of the invention, the first command may be a command which can be added by performing version up of a firmware included in the printing apparatus, and the second command may be a command provided in the firmware before the version up.

According to the aspect of the invention, since the first command is a command which causes the response of the first predetermined value to be executed using the function which can be added by performing version up of the firmware installed in the printing apparatus, and the second command is a command which causes the response of the second predetermined value to be executed using the function provided in the firmware before the version up, the control device can rapidly determine whether or not the first command is added by performing version up of the firmware.

In the aspect of the invention, the first predetermined value obtained by the first command may be a setting value of the printing apparatus, and the second predetermined value obtained by the second command may be a status of the printing apparatus.

According to the aspect of the invention, the control device can rapidly determine whether or not the printing apparatus corresponds to the command to be transmitted, depending on whether the setting value of the printing apparatus is received earlier than the status of the printing apparatus, or the status of the printing apparatus is received earlier than the setting value of the printing apparatus.

According to another aspect of the invention, there is provided a control method of a control device which determines whether or not a printing apparatus corresponds to a first command, in which the first command is a command which can be added by the printing apparatus and with which the control device requests a response of a first predetermined value to the printing apparatus, and a second command is a command to which the printing apparatus corresponds and with which the control device requests a response of a second predetermined value to the printing apparatus, the method including: (a) transmitting the first command to the printing apparatus; (b) transmitting the second command which requests the response of the second predetermined value to the printing apparatus, after (a); and (c) determining that the printing apparatus corresponds to the first command in a case in which the first predetermined value obtained by the first command is received earlier than the second predetermined value obtained by the second command from the printing apparatus.

According to the aspect of the invention, in a case in which the control device transmits the first command and the second command to the printing apparatus (corresponding to at least second command), and the first predetermined value obtained by the first command is received earlier than the second predetermined value obtained by the second command, since it is possible to determine that the first predetermined value obtained by the first command is received earlier than the second predetermined value obtained by the second command which can be reliably received, and it is determined that the printing apparatus corresponds to the first command, whether or not the printing apparatus is corresponding to the command to be transmitted can be rapidly determined.

In the control method of the control device according to the aspect of the invention, in the (c), in a case in which the second predetermined value obtained by the second command is received earlier than the first predetermined value obtained by the first command, it may be determined that the printing apparatus does not correspond to the first command, without waiting for receiving of the first predetermined value obtained by the first command.

According to the control method of the control device in the aspect of the invention, in a case in which the first command and the second command are transmitted, and the second predetermined value obtained by the second command is received earlier than the first predetermined value obtained by the first command, since it is determined that the printing apparatus corresponds to the first command, without waiting for receiving of the first predetermined value obtained by the first command, it is possible to rapidly determine whether or not the printing apparatus corresponds to the command to be transmitted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
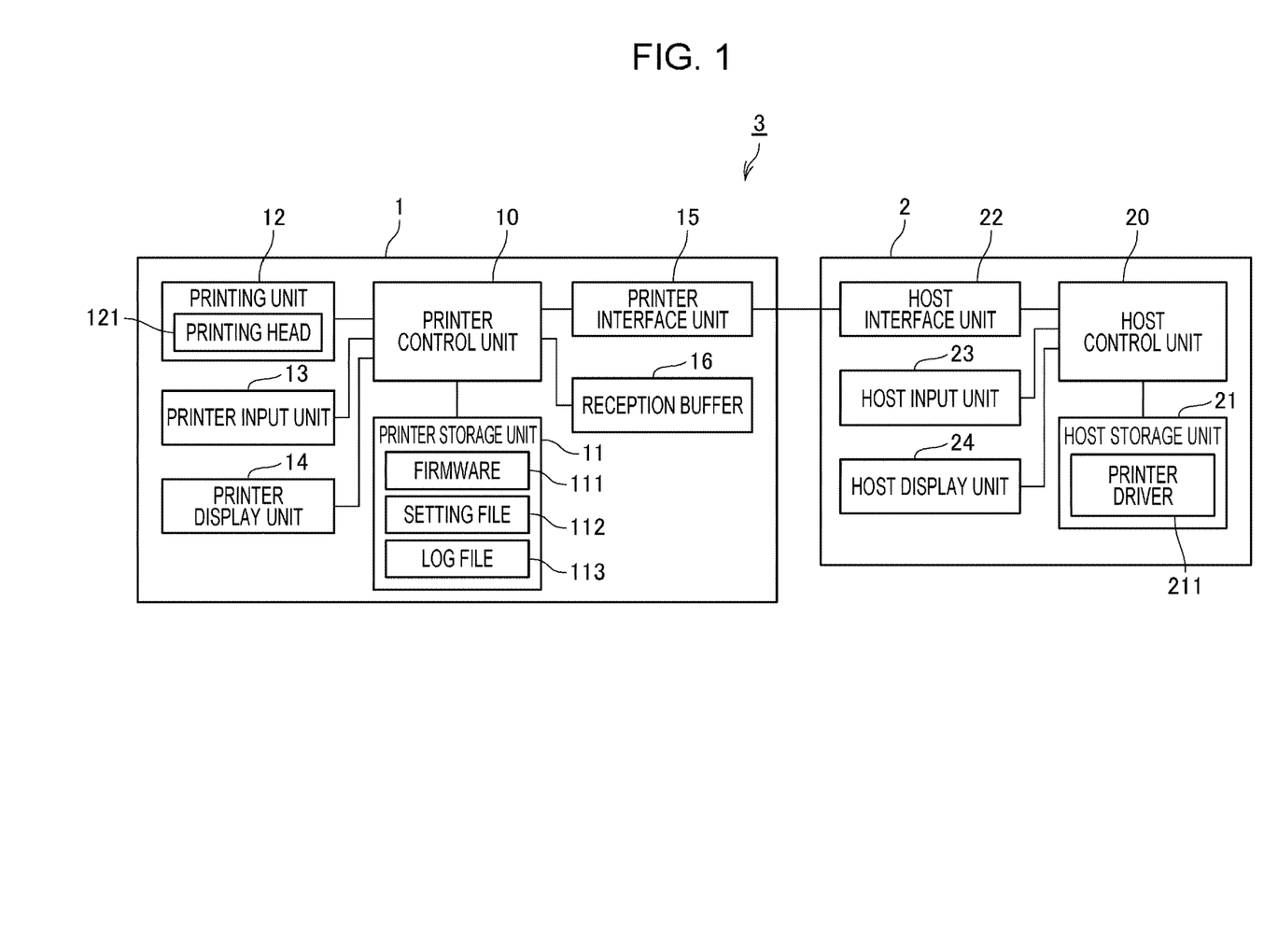
FIG. 1 is a diagram which illustrates a configuration of a printer and a host (host computer).

FIG. 1 is a diagram which illustrates configurations of a printer 1 (printing apparatus), and a host 2 (host computer, control device).

As illustrated in FIG. 1, a printing system 3 is provided with the printer 1 and the host 2.

The printer 1 is an ink jet printer which is provided with a printing head 121, and forms dots on a printing medium by ejecting ink from nozzles formed in the printing head 121.

As illustrated in FIG. 1, the printer 1 is provided with a printer control unit 10, a printer storage unit 11, a printing unit 12, a printer input unit 13, a printer display unit 14, a printer interface unit 15, and a reception buffer 16.

The printer control unit 10 is provided with a CPU (processor), a ROM, a RAM, peripheral circuits, and the like, other than those, and the CPU controls each unit of the printer 1, by reading out, and executing a firmware 111 stored in the printer storage unit 11.

The printer storage unit 11 is provided with a semiconductor storage element such as an electrically erasable programmable ROM (EEPROM), or a flash memory, or a storage medium such as a hard disk, and stores various data in a rewritable manner, and a non-volatile manner. The printer storage unit 11 stores the firmware 111, a setting file 112, and a log file 113.

The firmware 111 is a program which controls each unit in the printer 1.

The setting file 112 stores a combination of a setting item related to setting of the printer 1 such as printing density or a printing speed and a setting value corresponding to the setting item. The setting value means a specific value such as setting or a condition which is used when executing the firmware 111, and for example, a value of a printing speed (for example, value denoting any one of high speed, medium speed, and low speed), or the like, in a case in which the printing speed as a setting item is present.

The log file 113 is a file in which a predetermined operation of the printer 1, a status of the printer 1, and a predetermined phenomenon which occurs in the printer 1 are described in time series, as text data. For example, in the log file 113, in a case of running out of ink, information denoting an occurrence of running out of ink, and information denoting a date and time of the occurrence are described by being associated with each other.

The printing unit 12 is provided with a device, a mechanism, or the like, related to printing such as a printing head 121 which prints an image, characters, and the like, by ejecting ink, and forming dots on a printing medium, a carriage which causes the printing head 121 to perform main scanning, and a transport roller which transports a printing medium in a predetermined direction. The printing unit 12 controls the device, the mechanism, and the like, related to printing, and executes printing on the printing medium under a control of the printer control unit 10.

The printer input unit 13 is connected to various switches provided in the printer 1, detects an operation with respect to the switch, and outputs a detection result to the printer control unit 10.

The printer display unit 14 is connected to an LED provided in the printer 1, outputs a control signal to the LED under a control of the printer control unit 10, and turns on or off the LED in a predetermined form. The printer display unit 14 may be set to a configuration in which a display panel such as a liquid crystal display panel is provided, and various information are displayed on the display panel.

The printer interface unit 15 performs a communication conformable to a predetermined standard between the printer interface unit and the host 2 under a control of the printer control unit 10.

The reception buffer 16 is a temporary storage region which is referred to as a RAM, and is configured of a semiconductor storage device, for example. The reception buffer 16 stores a command received from an external device such as the host 2 under a control of the printer control unit 10. According to the embodiment, the reception buffer 16 stores a command received from the host 2 using the printer interface unit 15.

The host 2 is a control device which controls the printer 1. As illustrated in FIG. 1, the host 2 is provided with a host control unit 20 (control unit), a host storage unit 21, a host interface unit 22, a host input unit 23, and a host display unit 24.

The host control unit 20 is provided with a CPU (processor), a ROM, a RAM, peripheral circuits, and the like, other than those, and controls each unit of the host 2.

The host storage unit 21 is provided with the semiconductor storage element such as an EEPROM, or a flash memory, or a storage medium (memory) such as a hard disk, and stores various data in a rewritable manner, and a non-volatile manner. In addition, the host storage unit 21 stores a printer driver 211 (program). The printer driver 211 is a program for controlling the printer 1 from the host 2.

In the host 2, the printer driver 211 is installed in the host storage unit 21 in advance, and is stored. When the host 2 executes printing on a printing medium using the printer 1, the host control unit 20 generates a command or printing data by reading out the printer driver 211 from the host storage unit 21, and executing the printer driver, and outputs the generated command or printing data to the printer 1. The printer 1 receives the printing data, and executes various operations related to printing on a printing medium, by controlling the printing unit 12.

The host control unit 20 executes operations which will be described later, by reading out the printer driver 211 from the host storage unit 21, and executing the printer driver.

The host interface unit 22 executes a communication conformable to a predetermined standard between the interface unit and the printer 1 under a control of the host control unit 20.

The host input unit 23 is connected to an input unit such as various input devices, or an operating switch, detects an operation with respect to the input unit, and outputs a detection result to the host control unit 20.

The host display unit 24 is provided with a display device such as a display panel, and displays various information on the display device, under a control of the host control unit 20.

Meanwhile, in the printer 1, there is a case in which version up of the firmware 111 which is installed is performed. The version up of the firmware 111 means rewriting of the firmware 111 which is performed for an addition of a function (including command), or an addition, a correction, or the like, of the firmware 111. In this case, version up of the printer driver 211 of the host storage unit 21 of the host 2 is also performed so as to correspond thereto. When version up of the firmware 111 which is installed in the printer 1 is performed, there is a case in which the host 2 determines whether or not there is an addition (including addition of new command) of a new function (hereinafter, expressed by "new function") in the printer 1 due to the version up of the firmware 111, due to the function of the printer driver 211. The reason for this is that there is a case in which version up of the firmware 111 is not performed yet in the printer 1, or a case in which there is no addition of a new function even when version up of the firmware 111 is performed. The reason for this is to appropriately execute a control with respect to the printer 1, in order to prevent an occurrence of a situation in which a command for instructing executing of a new function is unnecessarily transmitted to the printer 1 by the host 2, or the like.

Here, as a method of determining whether or not a new function is added using version up of the firmware 111 of the printer 1, there is a method of transmitting a command which can determine whether or not there is an addition of a new function to the printer 1 by the host 2. The command which can determine whether or not there is an addition of a new function is a command accompanied with an addition of the new function, for example, and is a command which requests a setting value of a setting item which denotes the new function. In this method, the host 2 transmits the command to the printer 1, and determines whether or not a new function is added to the printer 1 using version up of the firmware 111 based on a presence or absence of the response of the printer 1 with respect to the transmitted command. More specifically, the host 2 transmits a command which can determine whether or not there is an addition of a new function, and in a case in which there is a response from the printer 1 with respect to the command, it is determined that the new function is added to the printer 1 using the version up of the firmware 111, since the printer 1 corresponds to the command. Meanwhile, in a case of no response, since the printer 1 does not correspond to the command, the host 2 determines that there is no addition of the new function to the printer 1. In this method, in a case in which there is a response on a command in a predetermined period after transmitting the command which can determine whether or not there is an addition of a new function in the printer 1, the host 2 determines that there is an addition of the new function, and determines that there is no addition of the new function in a case in which there is no response after a predetermined period. In this configuration, in a case in which there is no addition of the new function in the printer 1, using the version up of the firmware 111, it takes a predetermined period for the host 2 to determine that there is no addition of the new function. The longer the predetermined period until determining that there is no addition of the new function, the better, when taking a communication situation with the printer 1, or a processing load of the CPU of the printer 1 into consideration, in order to secure accuracy in the determination. However, the longer the predetermined period, a time for determining that there is no addition of the new function becomes long.

Here, when the printer driver 211 is configured so as to manage a version of the firmware 111 of the printer 1, and a command corresponding to the printer 1 on which the firmware 111 with the version is mounted, the above described determination is not necessary. However, a command corresponding to the printer 1 on which a firmware 111 of which a version is upgraded is mounted should be added to the printer driver 211, every time a version of the firmware 111 is upgraded, regardless of a presence or absence of an addition of a new function, such as the case of one printer driver 211 corresponding to printers 1 of various types, and it takes time and effort to manage a command.

Therefore, the host control unit 20 of the host 2 in the embodiment executes the following operation using a function of the printer driver 211.

Figure 2:
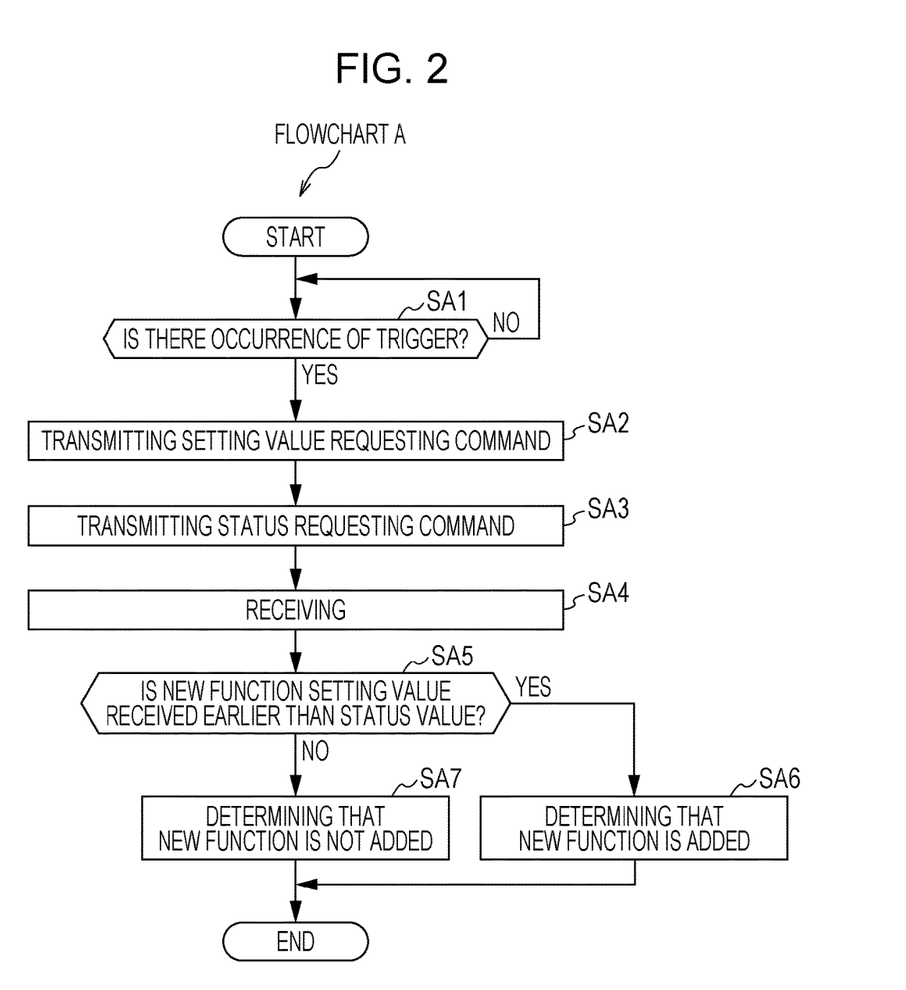
FIG. 2 is a flowchart which illustrates an operation of the host.

FIG. 2 is a flowchart which illustrates an operation of the host 2.

In the following descriptions, a firmware for performing rewriting in the firmware 111 of the printer 1, that is, a firmware for performing version up is expressed as a new firmware. In addition, a firmware 111 of the printer 1 before performing version up is expressed as an old firmware.

At a starting point in the flowchart in FIG. 2, it is assumed that a version of the firmware 111 of the printer 1 is upgraded from an old firmware to a new firmware. In addition, it is assumed that a version of the printer driver 211 of the host 2 is upgraded so as to correspond to the new firmware.

In the following descriptions, a case in which a new function (including command) not included in an old firmware is added to a new firmware will be exemplified. In addition, it is assumed that the new function is a function which can change a printing speed. That is, in the example, a printer 1 mounted with an old firmware is not able to change a printing speed, and a printer 1 mounted with a new firmware can change a printing speed.

It is assumed that a setting item denoting a new function, and a setting value corresponding to the setting item are added to a setting file 112, by rewriting the firmware 111 from an old firmware to a new firmware. According to the embodiment, it is assumed that a setting item denoting a printing speed (hereinafter, expressed as "printing speed setting item"), and a setting value corresponding to the printing speed setting item are added to the setting file 112, by performing rewriting from an old firmware to a new firmware.

The host control unit 20 of the host 2 determines whether or not there is an occurrence of a trigger for performing a determination whether or not a new function is added to the printer 1 (step SA1). For example, in a case in which an operation by a user with respect to an input unit to which the host input unit 23 is connected is detected, the host control unit 20 determines that there is an occurrence of the trigger. The trigger is not limited to the detection of the operation by the user with respect to the input unit, and a detection of version up of the firmware 111 of the printer 1 by the host 2 may be set to a trigger. In addition, the trigger may be set to inputting of power to the host 2, or an establishment of a communication with the printer 1. The trigger may be set to elapsing of a predetermined cycle for starting a determination whether or not a new function is added.

Subsequently, in a case of determining that there is an occurrence of a trigger of determining whether or not a new function is added to the printer 1 (Yes in step SA1), the host control unit 20 transmits a setting value requesting command (first command) using the host interface unit 22 (step SA2). The printer driver 211 has a function of transmitting the setting value requesting command, and the host control unit 20 transmits the setting value requesting command by executing the printer driver 211 of the printer 1.

According to the embodiment, the setting value requesting command is exemplified as the first command as a command corresponding to the printer 1 mounted with a new firmware. The setting value requesting command is a command requesting for a response of a setting value (first predetermined value) of a setting item denoting a new function which is added to the new firmware (hereinafter, expressed as "new function setting value"). The request for a response of a new function setting value means a request for transmitting of the new function setting value. According to the embodiment, the setting value requesting command is a command requesting for a setting value corresponding to the printing speed setting item, as a new function setting value, since a function which can change a printing speed is added as a new function of the printer 1, by upgrading the firmware 111 to a version of a new firmware. In this manner, since the setting value requesting command is a command requesting for the new function setting value, the setting value requesting command is a command which does not correspond to the printer 1 mounted with the old firmware to which the new function is not added. In other words, the printer 1 mounted with the old firmware does not correspond to the setting value requesting command. Meanwhile, the setting value requesting command is a command corresponding to the printer 1 mounted with the new firmware to which the new function is added.

Returning to descriptions of the flowchart in FIG. 2, when the setting value requesting command is transmitted, the host control unit 20 transmits a status requesting command (second command) to the printer 1 using the host interface unit 22 (step SA3). The printer driver 211 has a function of transmitting the status requesting command, and the host control unit 20 transmits the status requesting command, by reading out the printer driver 211, and executing thereof.

According to the embodiment, the status requesting command is exemplified as the second command, as a command corresponding to the printer 1 mounted with the new firmware, and the printer 1 mounted with the old firmware. The status requesting command is a command which requests a response of a value denoting a status of the printer 1 (second predetermined value) (hereinafter expressed as "status value"). The request for the response of the status value is a request for transmitting of the status value of the printer 1. For example, in a case in which a status is related to running out of ink, the status requesting command is a command requesting for transmitting of a value denoting whether ink is running out or not, as the status value. In a case of the example, it is possible to correspond to any one of the new firmware and the old firmware in advance, and any one of the printers 1 before and after version up transmits a value denoting whether ink is running out or not, by receiving the status requesting command.

In this manner, when there is an occurrence of a trigger for determining whether or not the new function is added to the printer 1, the host control unit 20 transmits the setting value requesting command, and then transmits the status requesting command to the printer 1 in this order, using the host interface unit 22. That is, the printer driver 211 has a function of transmitting these commands in order of the setting value requesting command, and the status requesting command, and the host control unit 20 transmits these commands to the printer 1 in the above described order, by executing the printer driver 211. An effect of transmitting the setting value requesting command and the status requesting command in this order will be described later.

Figure 3:
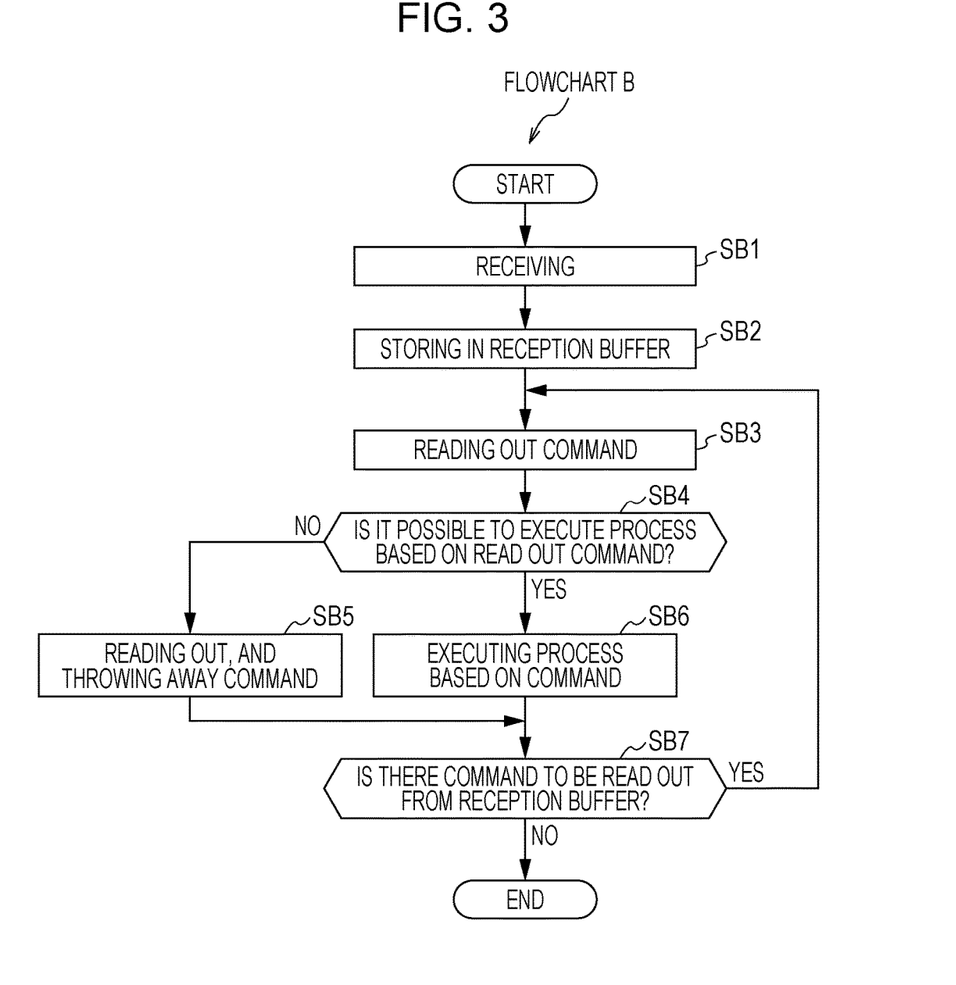
FIG. 3 is a flowchart which illustrates an operation of the printer.

FIG. 3 is a flowchart which illustrates an operation of the printer 1.

As illustrated in the flowchart B in FIG. 3, the printer control unit 10 of the printer 1 receives a command transmitted from the host 2 using the printer interface unit 15 (step SB1). According to the embodiment, since the host 2 transmits the setting value requesting command, and then transmits the status requesting command, the printer control unit 10 receives the setting value requesting command, and then transmits the status requesting command (step SB1). As described above, the host control unit 20 transmits the setting value requesting command, and the status requesting command in this order using the host interface unit 22. For this reason, the printer control unit 10 receives the commands in order of the setting value requesting command and the status requesting command.

Subsequently, the printer control unit 10 stores the received commands in the reception buffer 16 in order of the received command (step SB2). According to the embodiment, the printer control unit 10 stores the received setting value requesting command and status requesting command in the reception buffer 16 in order of the received command, that is, in order of the received setting value requesting command, and the status requesting command.

Subsequently, the printer control unit 10 reads out the commands in order of being stored in the reception buffer 16 (step SB3). Subsequently, the printer control unit 10 determines whether or not it is possible to execute a process based on the read command (step SB4), and in a case of determining that it is not possible to execute the process (No in step SB4), removes the command from the reception buffer 16, without executing the process based on the read command. That is, the command is removed or neglected (step SB5). On the other hand, in a case of determining that it is possible to execute the process (Yes in step SB4), the printer control unit 10 executes the process based on the command (step SB6). Subsequently, the printer control unit 10 determines whether or not there is a command to be read in the reception buffer 16, in addition to that (step SB7), and in a case of determining that there is a command to be read (Yes in step SB7), the printer control unit returns the process to step SB3, and reads the command from the reception buffer 16. On the other hand, in a case of determining that there is no command to be read in addition to that (No in step SB7), the printer control unit 10 ends the process.

Here, steps SB3 to SB7 will be described in detail. In the detailed descriptions, a case in which the firmware 111 is a new firmware, and a case in which the firmware 111 is an old firmware will be described as examples.

A Case of New Firmware

According to the embodiment, since the setting value requesting command and the status requesting command are stored in the reception buffer 16 in this order, the printer control unit 10 reads out the setting value requesting command which is stored in advance, as a command to be read out from the reception buffer 16 in step SB3.

Subsequently, the printer control unit 10 determines whether or not it is possible to execute a process based on the setting value requesting command which is read out (step SB4).

Here, the setting value requesting command is a command which includes at least an instruction code and a parameter, and requests a response of a new function setting value corresponding to a setting item which denotes a new function designated by the parameter. For example, it is assumed that the instruction code of the setting value requesting command is an "instruction code A" which denotes a request for a setting value corresponding to the setting item, and the parameter is "2" for designating the printing speed setting item.

The printer control unit 10 understands that the instruction code of the setting value requesting command denotes the "instruction code A", and determines that the setting value requesting command is a command which requests a response of a setting value corresponding to the setting item of the setting file 112. Subsequently, when understanding that the parameter of the setting value requesting command is "2", the printer control unit 10 determines whether or not there is the printing speed setting item, as the setting item corresponding to "2", in the setting item of the setting file 112. In addition, in a case of determining that there is the printing speed setting item in the setting item of the setting file 112, the printer control unit 10 determines that it is possible to execute a process based on the setting value requesting command which is read out.

According to the embodiment, the printing speed setting item is added as a setting item of the setting file 112, by rewriting the firmware 111 in the new firmware. For this reason, in a case of the printer 1 mounted with the new firmware, the printer control unit 10 determines that it is possible to execute a process based on the setting value requesting command (Yes in step SB4).

In a case of determining that it is possible to execute a process based on the setting value requesting command which is read out (Yes in step SB4), the printer control unit 10 executes the process based on the setting value requesting command (step SB6). That is, the printer control unit 10 transmits the new function setting value corresponding to a setting item denoting the new function designated by a parameter of the setting value requesting command to the host 2 (step SB6). In the embodiment, the printer control unit 10 transmits the setting value corresponding to the printing speed setting item to the host 2.

Subsequently, when executing the process based on the setting value requesting command, that is, when transmitting the new function setting value to the host 2, the printer control unit 10 determines whether or not there is another command to be read out in the reception buffer 16 (step SB7). According to the embodiment, since the status requesting command is stored in the reception buffer 16 after the setting value requesting command, the printer control unit 10 determines that there is another command to be read out (status requesting command) in the reception buffer 16 (Yes in step SB7).

Subsequently, the printer control unit 10 reads out the status requesting command from the reception buffer 16, as a command to be subsequently read out (step SB7).

Subsequently, the printer control unit 10 determines whether or not it is possible to execute a process based on the status requesting command which is read out (step SB4). According to the embodiment, the status requesting command is a command which can be executed by the printer 1 mounted with the new firmware, and the printer 1 mounted with the original document firmware. That is, the printer control unit 10 can execute the process based on the status requesting command in any of the firmware 111 which is the new firmware, and the firmware 111 which is the old firmware. For this reason, when reading out the status requesting command, the printer control unit 10 determines that it is possible to execute the process based on the status requesting command (Yes in step SB4).

Subsequently, the printer control unit 10 executes the process based on the status requesting command (step SB6). That is, the printer control unit 10 transmits a status value with respect to a status denoted by a parameter of the status requesting command to the host 2 using the printer interface unit 15, with reference to data described in the log file 113 (step SB6).

Here, the status requesting command includes at least an instruction code, and a parameter, and requests a response of a status value of the status designated by the parameter. For example, it is assumed that the instruction code of the setting value requesting command is an "instruction code B" which denotes a request for a status value, and the parameter is "1" which designates a status in which ink is running out or not. In this case, the printer control unit 10 understands that the instruction code of the status requesting command denotes the "instruction code B", and determines that the status requesting command is a command which requests a response of the status value. Subsequently, when understanding that the parameter of the status requesting command is "1", the printer control unit 10 determines that a status value to be transmitted is the status value denoting whether or not ink is running out. In addition, the printer control unit 10 transmits the status value denoting whether ink is running out or not to the host 2 with reference to the log file 113.

Subsequently, when executing the process based on the status requesting command, that is, when transmitting the status value to the host 2, the printer control unit 10 determines whether or not there is another command to be read out in the reception buffer 16 (step SB7). According to the embodiment, since there is no command to be stored in the reception buffer 16 after the status requesting command, the printer control unit 10 determines that there is no other command to be read out, in the reception buffer 16 (No in step SB7).

In this manner, in a case in which the firmware 111 of the printer 1 is the new firmware, the printer control unit 10 executes a process based on the command in order of the setting value requesting command and the status requesting command. That is, the printer control unit 10 transmits the new function setting value and the status value to the host 2 in this order.

A Case of Old Firmware

Subsequently, a case in which the firmware 111 of the printer 1 is the old firmware will be described. As described above, in the embodiment, the case in which the firmware 111 of the printer 1 has been rewritten to a new firmware has been exemplified; however, descriptions will be made in order to clarify the process of the printer control unit 10.

According to the embodiment, since the setting value requesting command and the status requesting command are stored in the reception buffer 16 in this order, the printer control unit 10 reads out the setting value requesting command which is stored in advance, as a command to be read out from the reception buffer 16, in step SB3.

Subsequently, the printer control unit 10 determines whether or not it is possible to execute a process based on the setting value requesting command which is read out (step SB4).

As described above, a new function is not added to the old firmware. For this reason, in a case of the printer 1 mounted with the old firmware, since the printing speed setting item is not added to the setting item of the setting file 112, the printer control unit 10 determines that it is not possible to execute the process based on the setting value requesting command (No in step SB4).

In a case of determining that it is not possible to execute the process based on the setting value requesting command (No in step SB4), the printer control unit 10 removes the setting value requesting command from the reception buffer 16 without executing the setting value requesting command, that is, throws away after reading, or neglect the setting value requesting command (step SB5). That is, the printer control unit 10 does not transmit the new function setting value to the host 2.

Subsequently, when throwing away the setting value requesting command after reading, the printer control unit 10 determines whether or not there is another command to read out in the reception buffer 16 (step SB7). According to the embodiment, since the status requesting command is stored in the reception buffer 16 after the setting value requesting command, the printer control unit 10 determines that there is another command to read out (status requesting command) in the reception buffer 16 (Yes in step SB7).

Subsequently, the printer control unit 10 reads out the status requesting command as a command to be subsequently read out, from the reception buffer 16 (step SB3).

Subsequently, the printer control unit 10 determines whether or not it is possible to execute a process based on the status requesting command which is read out (step SB4). According to the embodiment, the status requesting command is a command which can be executed by the printer 1 mounted with the new firmware, and the printer 1 mounted with the old firmware. That is, the printer control unit 10 can execute the process based on the status requesting command in any of the firmware 111 which is the new firmware and the firmware 111 which is the old firmware. For this reason, when reading out the status requesting command, the printer control unit 10 determines that it is possible to execute the process based on the status requesting command (Yes in step SB4).

Subsequently, the printer control unit 10 executes the process based on the status requesting command (step SB6). That is, the printer control unit 10 transmits a status value with respect to a status denoted by a parameter of the status requesting command to the host 2 using the printer interface unit 15, with reference to data described in the log file 113 (step SB6).

Subsequently, when executing the process based on the status requesting command, that is, when transmitting the status value to the host 2, the printer control unit 10 determines whether or not there is another command to be read out in the reception buffer 16 (step SB7). According to the embodiment, since there is no command to be stored in the reception buffer 16 after the status requesting command, the printer control unit 10 determines that there is no other command to be read out, in the reception buffer 16 (No in step SB7).

In this manner, in a case in which the firmware 111 of the printer 1 is the old firmware, the printer control unit 10 transmits only the status value to the host 2 without transmitting the new function setting value.

The case in which the printer control unit 10 transmits the status value to the host 2 when the printer 1 is mounted with the old firmware has been described. However, even when the new function is not added to the new firmware, similarly to the printer 1 mounted with the old firmware, the printer control unit 10 transmits only the status value without transmitting the new function setting value. The reason for this is that the printer control unit 10 throws the setting value requesting command away after reading, since the new function is not added to the new firmware.

Returning to the descriptions in FIG. 2, the host control unit 20 of the host 2 receives a value transmitted from the printer 1 (step SA4).

In a case in which the new firmware is mounted on the printer 1, the host control unit 20 receives the new function setting value using the setting value requesting command, and the status value using the status requesting command (step SA4). In addition, in a case in which the old firmware is mounted on the printer 1, the host control unit 20 receives the status value without receiving the new function setting value (step SA4).

Subsequently, the host control unit 20 determines whether or not the new function setting value using the setting value requesting command is received earlier than the status value using the status requesting command (step SA5). The printer driver 211 has a function of determining whether or not the new function setting value is received earlier than the status value, and the host control unit 20 executes the process in step SA5, by executing the printer driver 211.

In a case of receiving the new function setting value using the setting value requesting command earlier than the status value using the status requesting command (Yes in step SA5), the host control unit 20 determines that the new function is added, by performing version up of the firmware 111 of the printer 1 (step SA6). In a case of determining that the new function setting value is received earlier than the status value, the printer driver 211 has the function of determining that the new function is added to the printer 1, and the host control unit 20 executes the process in step SA6, by executing the printer driver 211.

As described above, the host control unit 20 transmits the commands to the printer 1 in order of the setting value requesting command, and then the status requesting command. In addition, the printer control unit 10 executes a process with respect to the command in received order, that is, in order of the setting value requesting command, and then the status requesting command. Here, in a case in which the new function is added to the firmware 111 of the printer 1, the printer control unit 10 transmits the new function setting value to the host 2 earlier than the status value, since the process is executed with respect to the setting value requesting command earlier than the status requesting command. According to the embodiment, since the case in which the new function is added to the new firmware, and the new firmware is mounted on the printer 1 by performing version up of the firmware 111 is exemplified, the printer control unit 10 transmits the new function setting value to the host 2 earlier than the status value. Accordingly, in a case in which the new function is added to the printer 1, the host control unit 20 can determine that the new function setting value is received earlier than the status value which can be reliably received, regardless of version up of the firmware 111. For this reason, in a case of determining that the new function setting value is received earlier than the status value, the host control unit 20 determines that the new function is added to the printer 1 by performing version up of the firmware 111 of the printer 1.

On the other hand, in a case of determining that the new function setting value is not received earlier than the status value (No in step SA5), the host control unit 20 determines that the new function is not added by performing version up of the firmware 111 of the printer 1, without waiting for a reception of the new function setting value (step SA7). In a case of determining that the new function setting value is not received earlier than the status value, the printer driver 211 has a function of determining that the new function is not added, without waiting for a reception of the new function setting value, and the host control unit 20 executes the process in step SA7, by executing the printer driver 211.

Since the host control unit 20 transmits the setting value requesting command, and the status requesting command to the printer 1 in this order, the printer control unit 10 executes the process with respect to the commands in this order. In addition, in a case in which the new function is not added, the printer control unit 10 reads and throws away the setting value requesting command, and executes the process with respect to the status requesting command. For this reason, in a case in which the new function is not added, the printer control unit 10 transmits the status value using the status requesting command, without transmitting the setting value using the setting value requesting command. Accordingly, in a case in which the new function is not added, the host control unit 20 receives the status value using the status requesting command earlier than the setting value using the setting value requesting command. For this reason, in a case of determining that setting value using the setting value requesting command is not received earlier than the status value using the status requesting command, the host control unit 20 determines that the new function is not added by performing version up of the firmware 111 of the printer 1.

In this manner, in a case of receiving the new function setting value earlier than the status value, the host control unit 20 determines that the new function is added to the printer 1 by performing version up of the firmware 111, and in a case of receiving the status value earlier than the new function setting value, the host control unit determines that the new function is not added to the printer 1. Here, the host control unit 20 is configured so that, in a case in which only the setting value requesting command is transmitted, and there is a response on the setting value requesting command in a predetermined period, the host control unit 20 determines that the new function is added, and in a case in which there is no response in a predetermined period, the host control unit determines that the new function is not added. In this configuration, in a case in which the new function is not added to the printer 1, it takes a time of a predetermined period for the host control unit 20 until determining that there is no addition of the new function. Therefore, the host control unit 20 according to the embodiment determines that there is no addition of the new function when there is a response on the status requesting command, even when there is no response on the setting value requesting command, using the function of the printer driver 211. For this reason, the host control unit 20 can rapidly determine whether or not the new function is added to the printer 1, using a command of the new function which is added by performing version up of the firmware 111 of the printer 1.

Whether or not the new function is added to the printer 1 is determined based on the setting value requesting command and the status requesting command which are transmitted to the printer 1 from the host 2. Accordingly, a determination that there is no addition of the new function corresponds to a determination that the printer 1 does not correspond to the setting value requesting command. In addition, a determination that there is an addition of the new function corresponds to a determination that the printer 1 corresponds to the setting value requesting command.

The host control unit 20 transmits the commands in order of the setting value requesting command and the status requesting command using the function of the printer driver 211. Here, in a case in which the host control unit 20 does not transmit the setting value requesting command and the status requesting command in this order, it is not possible to rapidly determine whether or not the new function is added to the printer 1. In detail, the printer control unit 10 executes the process in order of a command which is received from the host 2. Here, when the commands are received in order of the status requesting command and the setting value requesting command, the printer control unit 10 transmits the values to the host 2 in order of the status value, and the new function setting value. When the new function is not added by performing version up of the firmware 111, the printer control unit 10 does not transmit the new function setting value, and does not transmit the status value after the new function setting value. For this reason, it takes time for the host control unit 20 to determine whether or not the new function is added to the printer 1, and a situation in which the determination cannot be performed occurs. Therefore, according to the embodiment, since the commands are transmitted to the printer 1 in order of the setting value requesting command, and the status requesting command, since the host control unit 20 receives the status value using the status requesting command which is transmitted later, even when not receiving the new function setting value from the printer 1, the host control unit can rapidly determine whether or not the new function is added to the printer 1.

In the above descriptions, the case in which the new function is added to the printer 1, and the new function setting value corresponding to the setting item denoting the new function is transmitted using the setting value requesting command has been exemplified. However, the function of transmitting the setting value with respect to the setting item may be set to the new function. That is, the printer 1 can transmit the setting value with respect to the setting item, by upgrading a version of the firmware 111 to be mounted to a new firmware. In this case, the printer control unit 10 understands an instruction code of the setting value requesting command transmitted from the host 2, and transmits the setting value of the setting item designated by a parameter to the host 2 earlier than the status value. Meanwhile, in a case in which it is not possible to understand the instruction code, the printer control unit 10 understands that the setting value requesting command does not correspond, and does not execute transmitting of the setting value of the setting item. In addition, the printer control unit 10 transmits the status value without transmitting the setting value. Even in such a case, the host control unit 20 can exhibit the above described effect.

As described above, the printer driver (program) is a program which can be executed by the host control unit 20 (control unit) of the host 2 (control device) which can be connected to the printer 1 (printing apparatus). The host control unit 20 (processor) reads out the printer driver 211 from the host storage unit 21 (memory), and executes the printer driver, transmits the setting value requesting command (first command) which requests a response of the new function setting value (first predetermined value) from the printer 1, transmits the status requesting command (second command) which requests a response of the status value (second predetermined value), thereafter, and determines that the printer 1 corresponds to the setting value requesting command, in a case of receiving the new function setting value using the setting value requesting command earlier than the status value using the status requesting command, from the printer 1.

In this manner, since the new function setting value using the setting value requesting command is received earlier than the status value using the status requesting command which can be reliably received from the printer 1, using the function of the printer driver 211, and the printer 1 determines that the printer 1 corresponds to the setting value requesting command, the host control unit 20 rapidly determine whether or not the command transmitted from the host 2 corresponds to the printer 1. The fact that the command corresponds to the printer 1 means that it is possible for the printer 1 to execute the process based on the command. For this reason, the host control unit 20 can rapidly determine whether or not the command to be transmitted is a command which can be executed by the printer 1. In addition, even in a case in which it is not necessary for the printer driver 211 to manage the command, and a version of the firmware 111 is upgraded, it does not take time and effort when managing the command corresponding to the printer 1.

In a case in which the status value using the status requesting command is received earlier than the new function setting value using the setting value requesting command, the host control unit 20 has a function of determining that the printer 1 does not correspond to the setting value requesting command, without waiting for receiving of the new function setting value using the setting value requesting command.

In this manner, in a case of receiving the status value using the status requesting command earlier than the new function setting value using the setting value requesting command using the function of the printer driver 211, since the host control unit 20 determines that the printer 1 does not correspond to the setting value requesting command, without waiting for receiving of the new function setting value using the setting value requesting command, it is possible to rapidly determine whether or not the printer 1 corresponds to a command to be transmitted.

The setting value requesting command is a command for causing the response of the setting value to be executed using the function which can be added to the printer 1. The status requesting command is a command which causes the response of the status value to be executed using the function which is mounted on the printer 1 in advance.

The setting value requesting command is a command which causes the response of the setting value to be executed using the function which can be added to the printer 1. In addition, the status requesting command is a command is a command which causes the response of the status value to be executed using the function executed in the printer 1. For this reason, the host control unit 20 can rapidly determine whether or not the new function is added to the printer 1 using the function of the printer driver 211.

The setting value requesting command is a command which causes the response of the setting value to be executed using the function which can be added, by performing version up of the firmware 111 which is installed in the printer 1. In addition, the status requesting command is a command which causes the response of the status value to be executed using the function which is mounted on the firmware 111 before version up.

The setting value requesting command is a command which causes the response of the setting value to be executed using the function which can be added, by performing version up of the firmware 111 which is installed in the printer 1. In addition, the status requesting command is a command which causes the response of the status value to be executed using the function which is mounted on the firmware 111 before the version up. For this reason, the host control unit 20 can rapidly determine whether or not the new function is added by performing version up of the firmware 111, using the function of the printer driver 211.

The above described embodiment is merely one form of the invention, and it is possible to perform an arbitrary modification and application in the scope of the invention.

For example, in the above described embodiment, as the new function which is added to the new firmware, the function of changing a printing speed is exemplified; however, it is not limited to the function of changing a printing speed, and for example, may be a function of reducing an interval between one line and one line, when printing characters on a printing medium, or a function which is not mounted on the old firmware.

In the above described embodiment, as the first command, for example, the setting value requesting command which requests a response of the setting value of the setting item which denotes the new function added to the new firmware has been exemplified. However, the first command may be a command which requests a response of a predetermined value related to the new function, without being limited to the setting value requesting command, and may be a command which does not correspond to the printer 1 mounted with the old firmware, without being limited to the setting value requesting command. In addition, in the above described embodiment, as the second command, the command which requests a response of the status value has been exemplified. However, the second command may be a command which corresponds to the printer 1 mounted with the new firmware, and the printer 1 mounted with the old firmware, and may be a command requesting for responses.

For example, a form of receiving a new firmware when performing version up of the firmware 111 may be a reception from the host 2, and may be a configuration of receiving the new firmware through a storage medium such as a USB memory. In this case, the printer interface unit 15 is set to a configuration in which the storage medium can be connected to the interface unit.

For example, in a case in which a control method of the above described host 2 (control method of control device) is executed, using a computer provided in the host 2, it is also possible to configure the invention in a form of a program which is executed by the computer, a recording medium in which the program is recorded so as to be read in the computer, or a transmission medium which transmits the program, in order to execute the above described control method. As the above described recording medium, it is possible to use a magnetic and optical recording medium, or a semiconductor memory device. Specifically, there is a flexible disk, a hard disk drive (HDD), a compact disk read only memory (CD-ROM), a digital versatile disk (DVD), a Blu-ray (registered trademark) Disc, a magneto-optical disk, a flash memory, a portable recording medium such as a card-type recording medium, or a fixed-type recording medium. In addition, the above described recording medium may be a non-volatile storage device such as a random access memory (RAM), a read only memory (ROM), and an HDD which are internal storage devices provided in the host 2.

A unit of processing in FIG. 2 is divided according to main processing contents, for example, for ease of understanding of the processing in the host 2, and the invention is not limited by a method or a name of division of the unit of processing. The processing of the host 2 may be divided into more units of processing according to processing contents. In addition, one unit of processing may be divided so as to include more processing. A unit of processing in FIG. 3 is divided according to main processing contents for ease of understanding of the processing in printer 1, and the invention is not limited by a method or a name of division of the unit of processing. The processing of the printer 1 may be divided into more units of processing according to processing contents. In addition, one unit of processing may be divided so as to include more processing.

Each of functional units illustrated in FIG. 1 illustrates a functional configuration, and a specific mounting form thereof is not particularly limited. That is, it is not essential that hardware which individually corresponds to each functional unit is mounted, and as a matter of course, it is also possible to adopt a configuration in which functions of the plurality of functional units are executed when one processor executes a program. In addition, a part of functions which are executed in software in the above described embodiment may be executed in hardware, or a part of functions which are executed in hardware may be executed in software. In addition to that, a specific and detailed configuration of the host 2, and of each unit other than that of the printer 1 can be arbitrarily changed without departing from the scope of the invention.

In the above described embodiment, for example, the printer 1 has been exemplified as an ink jet printer; however it is not limited to this. For example, it is possible to apply the invention to another printer such as a thermal printer, a dot impact printer, or a laser printer.

What is claimed is:

1. A control device which determines whether or not a printing apparatus corresponds to a first command, in which the first command is a command which can be added by the printing apparatus and with which the control device requests a response of a first predetermined value to the printing apparatus, and a second command is a command to which the printing apparatus corresponds and with which the control device requests a response of a second predetermined value to the printing apparatus, the device comprising:

a memory which stores a printer driver corresponding to the printing apparatus to which the first command is added; and a processor which executes the following processes by reading the printer driver from the memory, (a) transmitting the first command to the printing apparatus, (b) transmitting the second command which requests the response of the second predetermined value to the printing apparatus, after (a), and (c) determining that the printing apparatus corresponds to the first command in a case in which the first predetermined value obtained by the first command is received earlier than the second predetermined value obtained by the second command from the printing apparatus.

2. The control device according to claim 1, wherein, in a case in which the second predetermined value obtained by the second command is received earlier than the first predetermined value obtained by the first command in the (c), the processor determines that the printing apparatus does not correspond to the first command, without waiting for receiving of the first predetermined value obtained by the first command.

3. The control device according to claim 1, wherein the first command is a command which causes the response of the first predetermined value to be executed using a function which can be added to the printing apparatus, and wherein the second command is a command which causes the response of the second predetermined value to be executed using a function which is provided in the printing apparatus in advance.

4. The control device according to claim 1, wherein the first command is a command which can be added by performing version up of a firmware included in the printing apparatus, and wherein the second command is a command provided in the firmware before the version up.

5. The control device according to claim 1, wherein the first predetermined value obtained by the first command is a setting value of the printing apparatus, and wherein the second predetermined value obtained by the second command is a status of the printing apparatus.

6. A control method of a control device which determines whether or not a printing apparatus corresponds to a first command, in which the first command is a command which can be added by the printing apparatus and with which the control device requests a response of a first predetermined value to the printing apparatus, and a second command is a command to which the printing apparatus corresponds and with which the control device requests a response of a second predetermined value to the printing apparatus, the method comprising:

(a) transmitting the first command to the printing apparatus;

(b) transmitting the second command which requests the response of the second predetermined value to the printing apparatus, after (a); and (c) determining that the printing apparatus corresponds to the first command in a case in which the first predetermined value obtained by the first command is received earlier than the second predetermined value obtained by the second command from the printing apparatus.

7. The control method of the control device according to claim 6, wherein, in the (c), in a case in which the second predetermined value obtained by the second command is received earlier than the first predetermined value obtained by the first command, it is determined that the printing apparatus does not correspond to the first command, without waiting for receiving of the first predetermined value obtained by the first command.

8. The control method of the control device according to claim 6, wherein, the first command is a command which causes the response of the first predetermined value to be executed using a function which can be added to the printing apparatus, and wherein the second command is a command which causes the response of the second predetermined value to be executed using a function which is provided in the printing apparatus in advance.

9. The control method of the control device according to claim 6, wherein, the first command is a command which can be added by performing version up of a firmware included in the printing apparatus, and wherein the second command is a command provided in the firmware before the version up.

10. The control method of the control device according to claim 6, wherein the first predetermined value obtained by the first command is a setting value of the printing apparatus, and wherein the second predetermined value obtained by the second command is a status of the printing apparatus.

* * * * *